Aug. 25, 1970

T. W. ROBERG 3,525,505

AIR FILTERING AND PUMPING WATER FAN CONSTRUCTION

Filed Sept. 13, 1968

Theodore W. Roberg
INVENTOR.

BY *[signatures]*
Attorneys

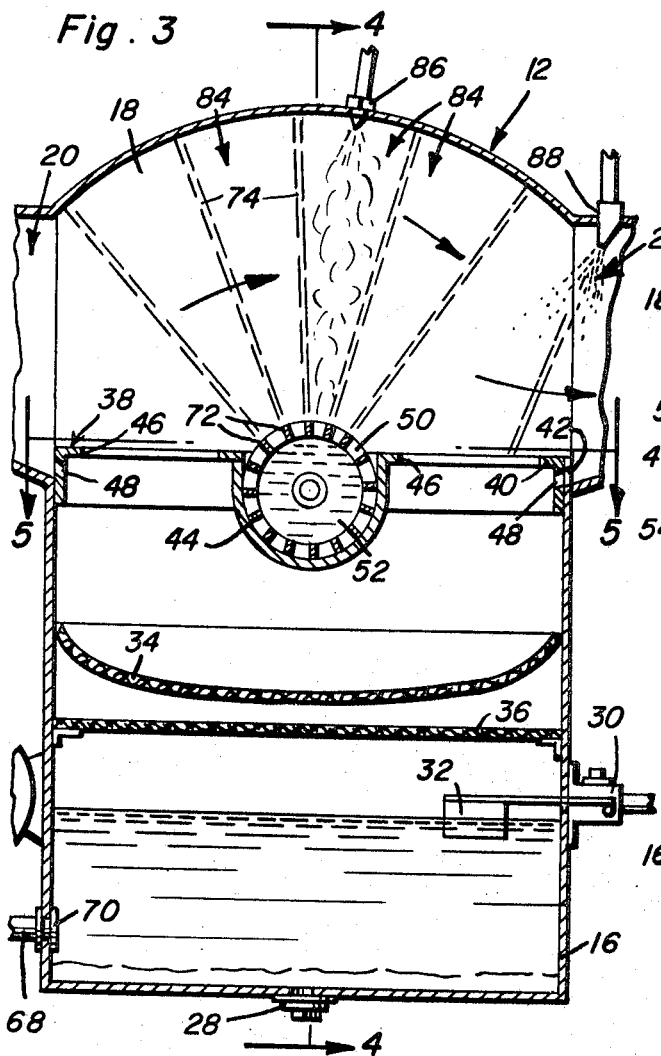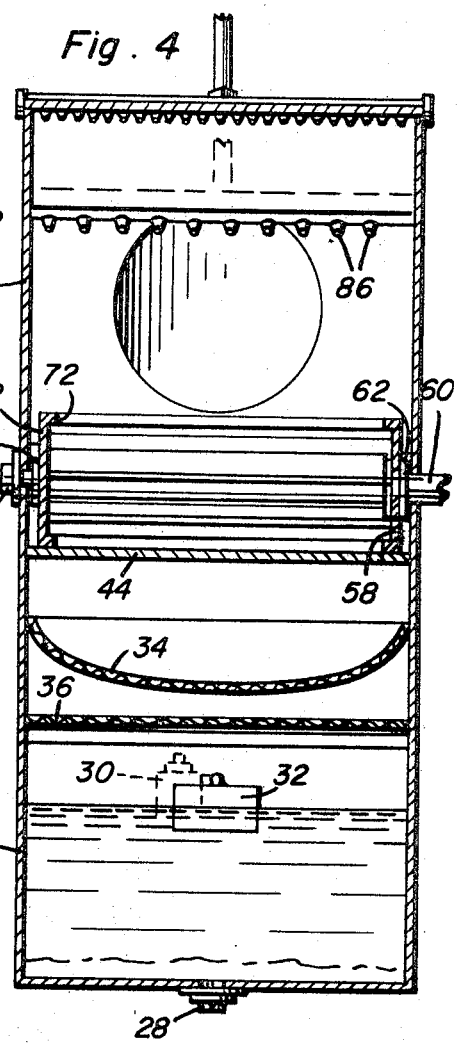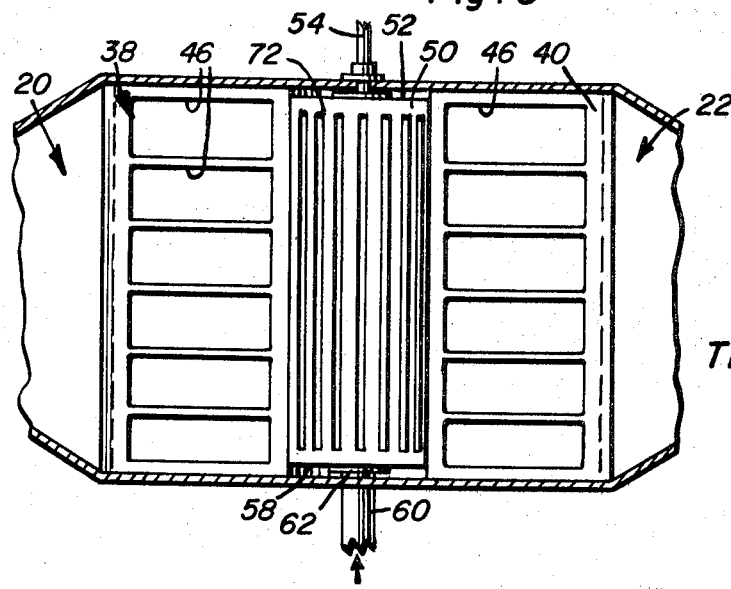

United States Patent Office 3,525,505
Patented Aug. 25, 1970

3,525,505
AIR FILTERING AND PUMPING WATER
FAN CONSTRUCTION
Theodore W. Roberg, R.F.D. 1,
Litchfield, Conn. 06759
Filed Sept. 13, 1968, Ser. No. 759,622
Int. Cl. B01f 5/20; B05b 3/12
U.S. Cl. 261—25                                          6 Claims

ABSTRACT OF THE DISCLOSURE

A device for filtering and pumping air wherein the combined function of pumping and filtering is carried out by walls of water which form the blades of the pump and perform part of the washing or filtering function. Additional washing of the air is carried out by passing the air through successive sprays of water. The water used for the pumping and cleaning also cools the cleaned air and permits recovery of chemicals carried by the air to be filtered.

---

Air pollution is currently a most serious problem and much time, money and effort is being expended in the field to combat such pollution. One of the problem areas is to clean the exhaust from the chimneys of buildings and other stationary machinery installations. Heretofore, the passing of the exhaust through small particle opening filters was the most common way of accomplishing this. It proved ineffective since if the smoke were to pass freely through the filter the particle openings had to be large enough so as not to restrict the flow and thereby cause back pressure to the machinery being exhausted, which allowed much pollution to also pass therethrough. If the particle openings were small enough to trap all the pollutants back pressure was created which required a pump to draw the exhaust out through the filter and ultimately out the chimney. Water filtration has proven to be more effective but raises some problems also. The most common application of the water filtration method is to spray a so-called sheet or wall of water across the exhausting air, which effectively sets up a barrier thereby requiring also a pump to draw the air therethrough. The heavily moisture-laden air requires a nonmetallic pump or other means to prevent corrosion as well as a large and costly installation to accomplish such pumping and filtration functions.

The present invention relates to an air pumping and filtration device that accomplishes both the function of pumping the air and filtration in one step, thereby simplifying the machinery needed. The device utilizes moving sheets or walls of water to move the air through the filtration unit, as well as the walls of cleaning water that the air is pumped through. Additional spraying of water into the pumping filtration unit will accomplish further filtration thereby assuring complete removal of all pollutants. The use of the water filtration system insures not only the filtration of particle pollutants but also odorific pollutants. All the water used in the pumping and filtration system is recovered in a tank and recirculated, thereby permitting, if desired, recovery of chemicals or other pollutants from the water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a sectional view taken substantially along the line 3—3 of FIG. 1.

FIG. 4 is a sectional view taken substantially along the line 4—4 of FIG. 3.

FIG. 5 is a sectional view taken substantially along the line 5—5 of FIG. 3.

Figure 1:
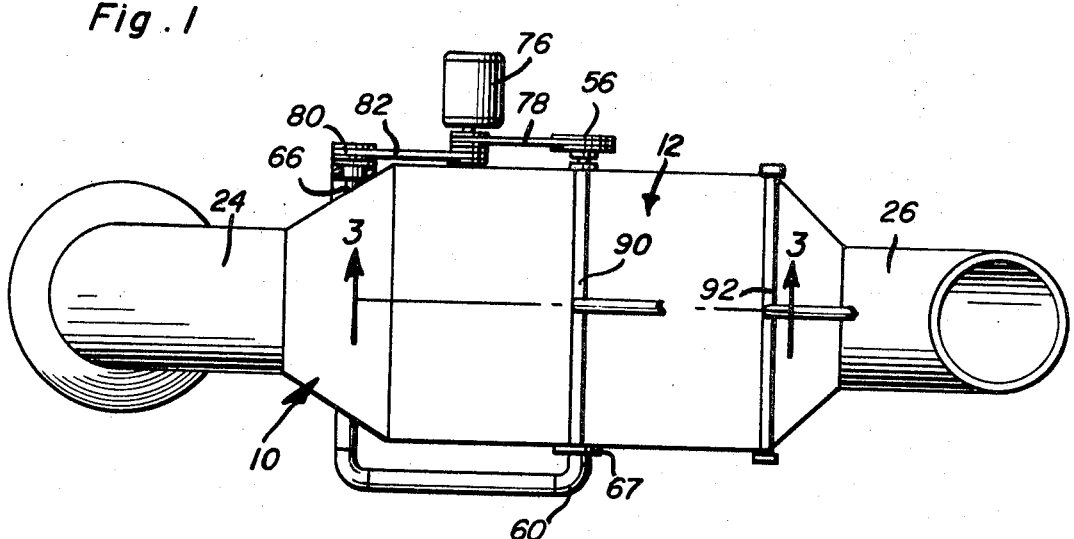
FIG. 1 is a top plan view of the air pumping and filtration device.
Figure 2:
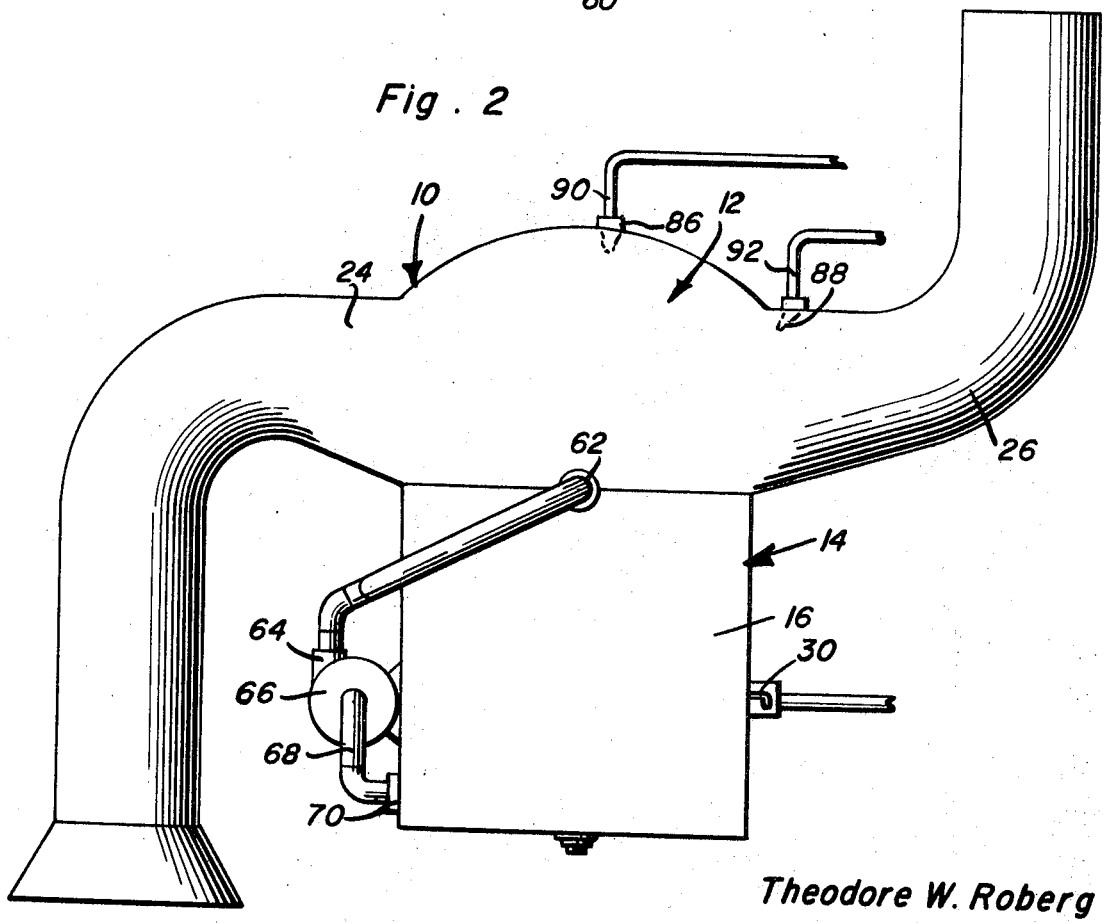
FIG. 2 is a side elevational view of the air pumping and filtration unit.

Referring now to the drawings, the numeral 10 generally indicates the pumping and filtration device, while numeral 12 indicates the pumping and filtration chamber and numeral 14 indicates the recovery and make-up tank section. The main structural member and support for the device 10 is a tank 16 which is a generally square cross-section member with the top open. Attached to the top or open end of the tank 16 is a semi-cylindrical pumping chamber 18 which closes the top of the tank and has an opening 20 at one side thereof and a similar opening 22 at the other side thereof. The opening 20 receives the exhaust or smoke collected by the stack 24 and funnels it into the pumping chamber 18. The opening 22 is the exhaust for the purified air and collects this air and discharges it into the outlet stack 26.

The tank 16 has a drain opening 28 in the bottom thereof to permit the draining and cleaning of the tank. The tank has a float valve 30 mounted on one side thereof and connected to a float 32 within the tank to keep the water in the tank at a predetermined level so that there will be no shortage of water to perform the pumping and filtration functions. Two filters 34 and 36 are supported from the walls of the tank 16 above the float valve 30 and, hence, above the level of the water. These filters will remove a large portion of the particle-type pollutants picked up by the washing water to minimize the sludge that will accumulate in the water maintained in the bottom of the tank.

A pump support base 38 is mounted at the top of the tank 16 where the semi-cylindrical pump chamber 18 joins the tank. The pump support base 38 has a parallel plate 40 which completely closes the top of the tank 16 and has depending vertical portions 42 for attachment to the walls of the tank 16. In the center of the horizontal plate 40 extending in a perpendicular relation to the sidewalls of the semi-cylindrical pump chamber 18, is a semi-cylindrical pump housing 44. The axis of the chamber 18 and the pump housing 44 are parallel, and the pump housing 44 is attached to and in sealing engagement with the aforementioned end walls of the tank. Drain openings 46 are cut into the horizontal plate 40 to permit water to drain therethrough, while drain openings 48 are cut into the depending vertical portions 42 of the horizontal support plate so that stray water accumulated in the stack 24 and the outlet stack 26 will drain back into the tank 16. A drum 50 is journaled in the walls of the tank 16, to rotate in the semi-cylindrical pump housing 44, and having an outside diameter essentially the same as the inside diameter of the housing 44. With the aforementioned diameters being essentially the same that portion of the circumference of the drum 50 in contact with the circumference of the housing 44 is effectively in sealing engagement. The drum is journaled at one end 52 thereof by a shaft 54 journaled in the sidewall and fixed to the end 52 of the drum. The shaft 54 extends beyond the wall of the tank and has a pulley 56 thereon whose function will be disclosed hereinafter. The drum 50 is journaled at the other end 58 thereof by a hollow tube opening into the interior of the drum 50 and journaled for rotation in the wall of the tank. The pipe 60 is fixed in sealing engagement to the wall of the tank 16 and provided with a rotary seal 62 where it enters the drum 50. The pipe 60 is connected to the outlet side 64 of a high pressure water pump 66. A pipe 68 supplies water to the inlet side of the high pressure pump 66 from the tank 16. The connection of the pipe 68 to the tank at 70 is located somewhat above the bottom of the tank so that any sediment accumulating thereon will not be drawn up into the pump. The pump, therefore, supplies water under extremely high pressure to the interior of the drum 50. The drum has longitudinal slots 72 cut therealong and around the complete circumference thereof. Thus the high pressure water when supplied to the interior of the drum will be emitted from these slots in the form of a sheet or wall of water 74 as shown in FIG. 3. The drum 50 is rotated by an electric motor 76 which drives the pulley 56 through a belt 78. The motor 76 similarly drives the high pressure pump 66 by means of a pulley 80 fixed to the pump shaft which in turn is driven by another belt 82. With the drum thus dirven the sheets or walls of water 74 are emitted from the slots 72 and impinge on the top of the pumping chamber thereby forming compartments 84 which positively trap volumes of contaminated air coming into the chamber via the stack 24. As the drum rotates these confined volumes of contaminated air are moved from left to right, as seen in FIG. 3, from the inlet of the pump chamber towards the outlet 22 thereof. The impinging water off the top of the pumping chamber serves to wash the trapped air as the sheets of water 74 move it thereacross. To further insure complete cleansing of the trapped air a series of atomizer nozzles 86 are arranged across the width of the pumping chamber on the top thereof to spray atomized water into each successive trapped compartment of air as it passes thereby. As a final cleansing operation a second series of nozzles 88 are arranged along the top of the outlet 22 of the pumping chamber. The nozzles are aimed generally inwardly towards the horizontal supporting plate 40 so that the water emitted therefrom will encounter all the air passing through the outlet 22 and the water will then drain through the openings 46 in the plate 40 and thereby be received in the tank 16. This angulation of the nozzles 88 will also prevent accumulation of water in the outlet stack 26. The nozzles 86 and 88 are fed by pipes 90 and 92, respectively, from any convenient water supply.

The operation of the device, as evidenced by the structure above set forth, is simple and straightforward. The water is drawn from the reservoir in tank 16 through the outlet 70 and pipe 68 to the high pressure water pump 66. The extremely high pressure water emitted from the pump is then fed via pipe 60 into the interior of the rotating drum 44. The high pressure water is emitted from the slots 72, which are not sealed by the circumference of the pump housing 44, in the form of walls or sheets of water 74 that impinge off the top of the pump chamber 18. The walls of water 74 thereby form closed moving compartments 84 which progress across the pump chamber from the inlet 20 toward the outlet 22. The water that impinges off the top of the pump chamber 18 is thereby dispersed into the compartments 84 providing a cleansing action on the air trapped therein. Further, as each compartment 84 passes the row of atomizing nozzles 86 further cleansing action is imparted thereto by the atomized water emitting from the nozzles. The trapped air in each compartment 84 is released as the leading wall or sheet of water is shut off at the outlet end of the pump housing 44, thereby forcing the air out of the outlet 22. A final last rinsing is applied to the air by a row of nozzles 88 stretching across the outlet 22. All of the water used in the pumping and atomizing operations drain back into the reservoir in tank 16 by passing through the drain openings 46 in the supporting plate 40 or if some stray water has accumulated in either the outlet chamber 22 of the pumping chamber or the inlet 20 thereof this water will in turn drain through openings 48 into the reservoir of water. If any water should be lost the float 32 on the float valve 30 will sense the drop in water level and additional water will be made up to maintain the level at a height sufficient to enable the device to operate efficiently. The pump 66 and the drum 50 can be driven by a single motor 76 which drives pulleys mounted on the aforesaid pump and drum. As can thus be seen, a simple and highly efficient air pump and cleaner combination is achieved by the use of water to both pump the air and clean it. The unit is highly efficient in its removal of pollutants from exhaust air, and can be used to boost the efficiency of machinery whose exhaust air it cleanses by increasing the pressure exerted by the pumping mechanism to thereby provide a scavenging effect on the aforesaid machinery. Also, due to the high efficiency of the pollutant removal capabilities of the device, chemicals or other valuable substances can be recovered from the water in the reservoir.

What is claimed as new is as follows:

1. In combination with a horizontally elongated chamber having opposite inlet and outlet ends and defining a substantially straight flow path for gases to flow through said chamber from said inlet end to said outlet end, said chamber including an open bottom, an upwardly opening liquid tank supported from said chamber in registry with the open bottom thereof in closing relationship therewith, a generally horizontal upwardly opening semi-cylindrical housing supported in and extending transversely of the open bottom of said chamber centrally intermediate said inlet and outlet ends and spaced from the opposite ends of said open bottom, inlet and outlet stacks including generally horizontal outlet and inlet ends, respectively, opening into said inlet and outlet ends of said chamber and including lower wall portions inclined downwardly toward the adjacent ends of said open bottom of said chamber, a hollow generally cylindrical drum journalled in said housing and including elongated axially extending and circumferentially spaced generally radial outlet slots formed therein, drive means operatively connected to said drum for rotating the latter and liquid supply means operatively connected to said drum for admitting liquid thereinto under pressure for fan-like discharge of said liquid from said slots during rotation of said drum, said semi-cylindrical housing including opposite side upper longitudinally extending marginal edge portions projecting above a horizontal plane containing the axis of rotation of said drum, whereby said fan-like discharge of said liquid will be free of portions thereof directed axially into said outlet and said inlet ends of said inlet and outlet stacks, the lower portion of said tank defining a liquid sump into which liquid discharged from said slots may drain by gravity and comprising a portion of said liquid supply means, the latter also including a driven liquid pump including an inlet communicated with said sump and an outlet communicated with the interior of said drum.

2. The combination of claim 1 including a generally horizontal filter defining partition disposed in the upper portion of said tank below said housing and above said sump.

3. The combination of claim 1 including float controlled liquid supply means operatively associated with said tank for maintaining the level of liquid in said sump above a predetermined minimum level.

4. The combination of claim 1 including liquid jet discharge means disposed in the upper portion of the inlet end of said outlet stack with which said outlet of said pump is operatively communicated, said liquid jet discharge means being operative to discharge jets of liquid downwardly and inwardly along paths passing through the adjacent end of the open bottom of said chamber into said tank.

5. The combination of claim 4 including additional liquid jet discharge means disposed in the upper portion of said chamber above said drum with which said pump outlet is also communicated, said additional jet discharge means being operative to discharge downwardly toward said drum jets of water defining a curtain extending transversely of the central portion of said chamber.

6. The combination of claim 1 wherein the upper wall of said chamber is generally partially cylindrical and the axis of curvature of said upper wall generally coincides with the axis of rotation of said drum.

References Cited

UNITED STATES PATENTS

| 785,724 | 3/1905 | Eyermann | 261—88 X |
| 1,100,144 | 6/1914 | Noble | 261—88 |
| 1,178,651 | 4/1916 | Leblanc | 230—108 |
| 1,198,640 | 9/1916 | Leblanc | 230—108 |
| 1,233,275 | 7/1917 | Kerr | 230—108 |
| 2,237,482 | 4/1941 | Faber | 55—230 |
| 3,001,691 | 9/1961 | Salmon et al. | 230—108 |
| 3,194,163 | 7/1965 | Lee | 230—108 X |

FOREIGN PATENTS

| 492,642 | 3/1919 | France. |

TIM R. MILES, Primary Examiner

U.S. Cl. X.R.

55—230; 230—108; 261—88